G. A. BUBAR.
SPRING OILING DEVICE.
APPLICATION FILED OCT. 23, 1916.
1,245,434.
Patented Nov. 6, 1917.
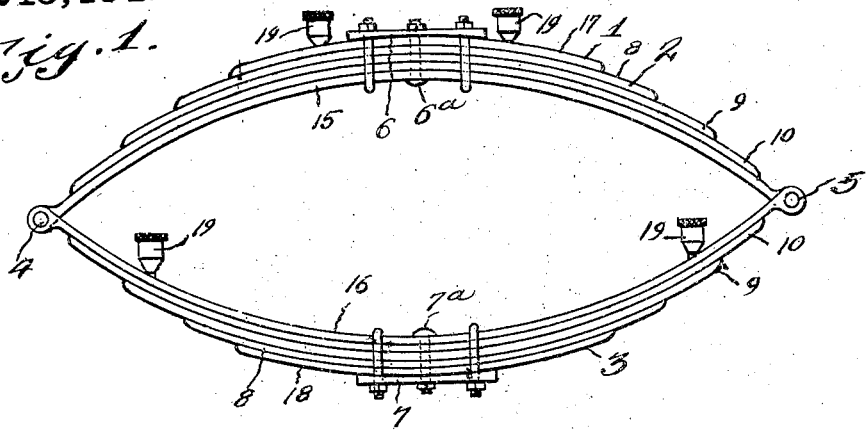
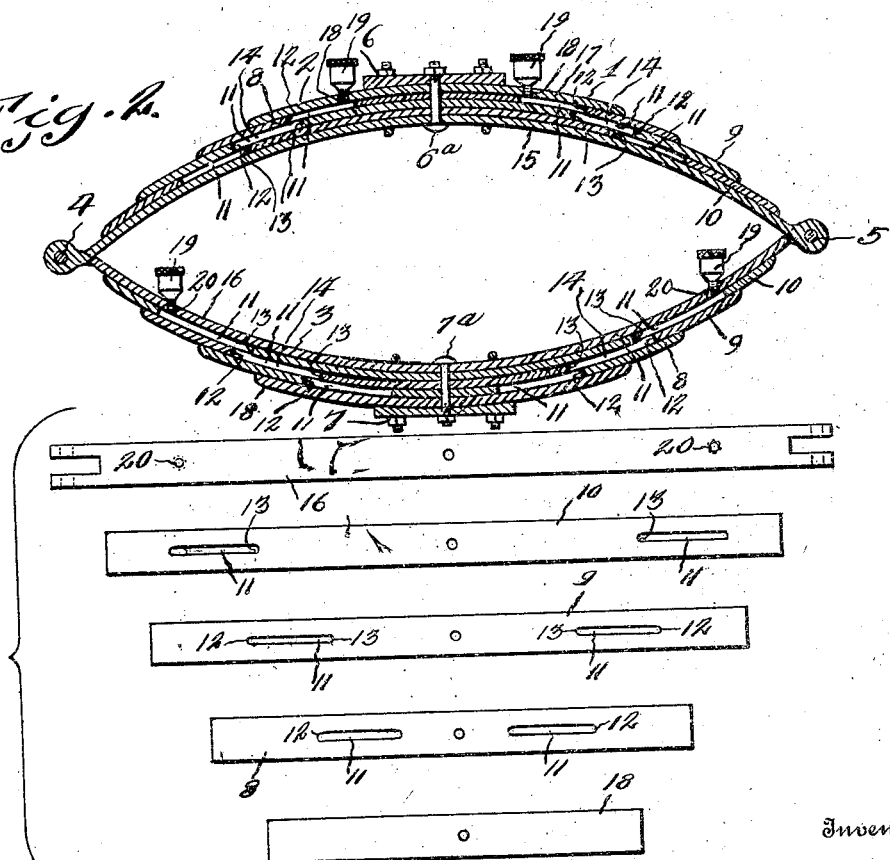

UNITED STATES PATENT OFFICE.

GEORGE A. BUBAR, OF SUPERIOR, WISCONSIN.

SPRING-OILING DEVICE.

1,245,434.  Specification of Letters Patent.  Patented Nov. 6, 1917.

Application filed October 23, 1916. Serial No. 127,164.

*To all whom it may concern:*

Be it known that I, GEORGE A. BUBAR, a citizen of the United States, residing at Superior, in the county of Douglas and State of Wisconsin, have invented certain new and useful Improvements in Spring-Oiling Devices, of which the following is a specification.

The invention relates to vehicle springs and particularly to that type generally known as elliptic leaf springs.

The disadvantage incident to the use of elliptic leaf springs on vehicles is that the leaves of the spring become dry and rusty in use and squeak. To prevent this squeaking, it is common practice to lubricate the leaves of the springs, but it is difficult to get the lubricant between the leaves without forcing a pointed tool between the various leaves, which often results in distorting the leaves, and even then the lubricant is soon pressed out from between the leaves.

My invention has for its principal object to overcome this disadvantage above noted by providing a spring so constructed that the lubricant will be constantly supplied to the contacting surfaces of the various leaves.

A particular object is to construct the spring so that the lubricant will be fed downwardly by gravity through a series of overlapping slots in each leaf, said slots forming a chamber from which the lubricant will slowly penetrate and gravitate between the various leaves of the spring.

A further object is to provide an elliptic leaf spring, having lubricant chambers on each side of a vertical center line of the spring, formed by a series of overlapping slots in the leaves of the spring, and maintaining a constant lubricant level in the chambers at all times. This is accomplished by having lubricant cups or source of lubricant supply higher than the tops of the chambers.

The invention further consists in the construction of the leaves, arrangement and combination of parts, which will be more fully set forth hereafter.

Other objects will appear and be better understood from the embodiment of my invention of which the following is a specification, reference being had to the accompanying drawings forming part thereof, in which:—

Figure 1, is a side elevation of my improved vehicle spring;

Fig. 2, is a vertical longitudinal sectional view of the spring, showing the overlapping slots forming chambers and, Fig. 3, is a collective view of the various leaves of the lower section of the spring showing the relative positions of the various slots.

Referring to the drawings:

1 designates a conventional form of elliptic spring, which consists of an upper section 2 and a lower section 3, these sections being hingedly connected at 4 and 5 thereby forming what is known as an elliptic spring. The sections 2 and 3 are similar in construction and comprise a series of leaves, which are held tightly together by means of the clamping members 6 and 7 and also by bolts $6^a$ and $7^a$ thereby holding the leaves in relative positions to each other. Leaves 8, 9 and 10 on each side of the vertical center of the spring are provided with elongated slots 11, which are so disposed that the outermost ends 12 of said slots will overlap the innermost ends 13 of the slots of the adjacent leaves, thereby forming chambers 14.

The long leaves 15 and 16 are not slotted thereby forming a bottom and top for the chambers 14. Leaves 17 and 18 are disposed upon the leaves 8 thereby forming a top and bottom for the lubricant chambers. The leaf 17 is provided with apertures 18 for the reception of grease or lubricant cups 19, which are so disposed that their lower ends will be in registration with the slots 11 in leaf 8, but higher than the upper surface of said slot so that the chambers 14 will fill with oil which will, by gravity, penetrate between the leaves and lubricate the same.

Section 3 of the spring is substantially of the same construction as section 2 except that the oil cups 19 are threaded into apertures 20 in the long leaf 16 and are in registration with the slots 11 of the leaf 10. It will be noted that these lubricant cups are higher than the upper surfaces of the chambers 14 thereby providing means for maintaining a constant lubricant level and supply and at the same time allowing the lubricant to penetrate between the leaves by gravity.

Having thus described my invention what I claim as new and desire to secure by Letters Patent is:

A spring comprising a series of superimposed leaves, said leaves having elongated slots of equal width overlapping each other thereby forming openings of communication between the slots of the various leaves, the openings of communication being variable in length during the bowing action of the spring thereby breaking any solidified lubricant that may form adjacent the openings of communication, said slots and openings of communication forming a lubricant chamber of equal width so as to allow the free flow of the broken particles of solidified lubricant to the lower end of the lubricant chamber where the same can be removed, top and bottom leaves forming closures for the lubricant chamber and means for maintaining a constant lubricant supply in said chamber.

In testimony whereof I affix my signature in the presence of two witnesses.

GEORGE A. BUBAR.

Witnesses:
C. R. FRIDLEY,
AGNES M. TUBBS.